United States Patent
Huang et al.

(10) Patent No.: US 8,694,003 B2
(45) Date of Patent: Apr. 8, 2014

(54) LTE RRC CONNECTION RE-ESTABLISHMENT REQUESTING METHOD, CAUSE VALUE SETTING METHOD AND TERMINAL

(75) Inventors: Bo Huang, Shenzhen (CN); Haijun Liu, Shenzhen (CN); Jian Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 602 days.

(21) Appl. No.: 12/989,790

(22) PCT Filed: Aug. 7, 2009

(86) PCT No.: PCT/CN2009/073147
§ 371 (c)(1),
(2), (4) Date: Oct. 27, 2010

(87) PCT Pub. No.: WO2010/017753
PCT Pub. Date: Feb. 18, 2010

(65) Prior Publication Data
US 2011/0117905 A1 May 19, 2011

(30) Foreign Application Priority Data
Aug. 12, 2008 (CN) .......................... 2008 1 0142499

(51) Int. Cl.
*H04W 36/00* (2009.01)
*H04W 36/14* (2009.01)
*H04W 72/08* (2009.01)
*H04W 36/24* (2009.01)

(52) U.S. Cl.
CPC ...... *H04W 36/0083* (2013.01); *H04W 36/0066* (2013.01); *H04W 36/14* (2013.01); *H04W 36/00* (2013.01); *H04W 72/082* (2013.01); *H04W 72/085* (2013.01); *H04W 36/005* (2013.01); *H04W 36/24* (2013.01)
USPC ........ 455/436; 455/422.1; 455/443; 455/439; 455/435.1; 455/435.2; 455/435.3; 455/437; 455/450; 455/510; 370/208; 370/395.2; 370/331; 370/332

(58) Field of Classification Search
USPC ............... 455/435.1, 435, 2, 435.3, 436, 437, 455/438, 439, 450, 510; 370/208, 395.2
See application file for complete search history.

(56) References Cited

U.S. PATENT DOCUMENTS

| 6,845,245 B2 | 1/2005 | Hunzinger |
| 2002/0082032 A1* | 6/2002 | Hunzinger .................... 455/510 |

(Continued)

FOREIGN PATENT DOCUMENTS

| CN | 1511138 A | 7/2004 |
| CN | 1852531 A | 10/2006 |

OTHER PUBLICATIONS

Universal Mobile Telecommunications System (UMTS); Radio Resource Control (RRC);Protocol specification (3GPP TS 25.331 version 7.6.0 Release 7, Oct. 2007.*

(Continued)

*Primary Examiner* — Nimesh Patel
(74) *Attorney, Agent, or Firm* — Oppedahl Patent Law Firm LLC

(57) ABSTRACT

The present invention discloses a method for requesting LTE RRC connection re-establishment and setting cause values as well as a terminal, and the connection re-establishment request method includes: an LTE terminal determines, according to the occurred scenario, which one of the following four types is the failure reason: radio resource failure, handoff failure, bottom layer error or UE-related error; and the LTE terminal initiates an RRC connection re-establishment request to the network side, wherein the RRC connection re-establishment request includes the failure cause value indicating the failure reason. The present invention can make the network side obtain the reason why the UE initiates the RRC re-establishment from RRC connection re-establishment request message, so as to take different subsequent operations with respect to these different failure reasons.

8 Claims, 2 Drawing Sheets

(56) References Cited

U.S. PATENT DOCUMENTS

2007/0004398 A1 1/2007 Juan
2008/0167042 A1* 7/2008 Kitazoe .................. 455/436

OTHER PUBLICATIONS

Notification of the First Office Action of Chinese application No. 200810142499.4, issued on May 18, 2011.

International Search Report on international application No. PCT/CN2009/073147, mailed on Nov. 12, 2009.

English Translation of the Written Opinion of the International Search Authority in international application No. PCT/CN2009/073147, mailed on Nov. 12, 2009.

* cited by examiner

RELATED TECHNOLOGIES

LTE RRC CONNECTION RE-ESTABLISHMENT REQUESTING METHOD, CAUSE VALUE SETTING METHOD AND TERMINAL

TECHNICAL FIELD

The present invention relates to the field of radio communications, and especially to a method for setting related cause values and to a corresponding method for requesting for re-establishing a connection when a UE sends an RRC connection re-establishment request, in an LTE.

BACKGROUND

First of all, abbreviations of the invention are defined as follows:

3GPP: $3^{rd}$ generation partnership project, which is a leading group for constituting 3G technical specification.

LTE: long term evolution, which is a long term evolution project for a radio access network, started by 3GPP in December, 2004.

UTRA: Universal Terrestrial Radio Access.
E-UTRA: Evolved-UTRA.
UTRAN: Universal Terrestrial Radio Access Network.
E-UTRAN: Evolved-UTRAN.
eNB: Evolved-NodeB.
IP: Internet Protocol.
SAE: System Architecture Evolution.
OFDM: Orthogonal Frequency Division Multiplexing.
SC-FDMA: Single Carrier-Frequency Division Multiple Access.
RRC: Radio Resource Control.
RLC: Radio Link Control.
SRB1: Signalling Radio Bearer 1.
UE: User Equipment.

A robust mobile communication system can be continuously enhanced as requirements increase, and can provide higher data rate for users and better coverage as well as bigger capacity for networks. For these considerations, and driven by the technology, 3GPP started up a long term evolution (LTE) project for a radio access network, an evolved access technology E-UTRA and an evolved access network E-UTRAN, and a packet-domain core network evolution project SAE facing all-IP, in December, 2004. They expected to provide a better support for the increasing requirements of operators and users by continuing evolution and enhancement from radio interfaces to a core network, to keep the first-mover advantage of technology in the field of mobile communications.

The LTE is a technology based on an OFDM/SC-FDMA, and main performance objectives of the 3GPP LTE project include:

providing a peak rate of 100 Mbps for the downlink and 50 Mbps for the uplink within a spectral bandwidth of 20 MHz;
is improving users' performance at the edge of cells;
increasing the capacity of cells;
reducing the delay of the system, making the time delay of unidirectional transmission of a user plane lower than 5 ms, making the migration time from a sleeping state to an activated state less than 50 ms, and making the migration time from a resident state to an activated state less than 100 ms;
supporting the cell coverage with a 100 Km radius;
being capable of providing an access service with the rate more than 100 kbps for mobile subscriber with a high speed of 350 Km/h; and
supporting paired or unpaired spectrum, and being capable of flexibly allocating multiple bandwidths from 1.25 MHz to 20 MHz.

A procedure of RRC connection re-establishment is described in 3GPP RRC protocol. The object of the procedure is to re-establish the RRC connection, which includes restoring SRB1 and reactivating the security. FIG. 1 is a procedure of RRC connection re-establishment (successfully), which includes the following steps from step S01 to step S03 as shown in FIG. 1.

Step S01, in the case that the security has been activated, in order to keep the RRC connection, the UE at the state of connection (RRC_CONNECTED) sends an RRC connection re-establishment request message (RRCConnectionReestablishmentRequest) to the network side.

Step S02, the network side receives the re-establishment request sent from the UE and delivers an RRC connection re-establishment message (RRCConnectionReestablishment). After the UE receives the message, related procedures are as follows:
1. stopping related timers;
2. restoring SRB1 according to the configuration of radio resource;
3. configuring integrality protection used previously for the bottom layer reactivation; and
4. configuring a encryption algorithm used previously for the bottom layer reactivation.

Step S03, The UE sends an RRC connection re-establishment complete message is (RRCConnectionReestablishmentComplete) to the network side, then the procedure of RRC connection re-establishment ends.

There are many scenarios for initiating an RRC connection re-establishment. Four types of occasions defined in 3GPP RRC protocol, on which a UE needs initiating an RRC connection re-establishment request, include:
1. the UE detects that radio links fail;
2. the cell handoff fails in an E-UTRAN;
3. the RLC identification reaches the maximum retransmission time, and needs to be reset; and
4. an RRC connection reconfiguration fails, including:
   A. measurement configuration fails;
   B. mobility control (including security configuration), i.e. handoff, fails;
   C. the configuration of non-access stratum dedicated information fails;
   D. the configuration of dedicated radio resource fails; and
   E. the configuration of the information related to the UE fails.

In related techniques, when each scenario happens, the network side knows nothing about the particular reason why the UE initiates a connection re-establishment request, so it cannot make different processes with respect to the different re-establishment requests.

SUMMARY

The present invention is proposed for the problem that in the related technique, the network side cannot understand the particular cause why the UE initiates a re-establishment request, so that it cannot make corresponding processes according to the different re-establishing requests. Therefore, the main object of the present invention is to provide a method for requesting an LTE RRC connection re-establishment and a method for setting the cause values as well as a terminal, to solve at least one of the above-mentioned problems.

In order to achieve the above-mentioned objects, according to one aspect of the is present invention, a method for setting the cause values of the LTE terminal's RRC connection re-establishment request is proposed.

According to the present invention, the method for setting the cause values of the LTE terminal's RRC connection re-establishment request includes:

When an UE detects the failure of radio link or the dedicated radio resource configuration, the LTE terminal adds a flag bit which indicates the failure reason is radio resource failure into the RRC connection re-establishment request message;

When the cell handoff fails in E-UTRAN or the mobility control (including security configuration), i.e. handoff, fails, the LTE terminal adds a flag bit which indicates the failure reason is handoff failure into the RRC connection re-establishment request message;

When the RLC identification reaches the maximum retransmission times and needs to be reset, the LTE terminal adds a flag bit which indicates the failure reason is bottom layer error into the RRC connection re-establishment request message;

When measurement configuration, the configuration of non-access stratum dedicated information or the UE-related information configuration fails, the LTE terminal adds a flag bit which indicates the failure reason is terminal error into the RRC connection re-establishment request message.

Preferably, the flag bit indicating the failure reason may occupy 2 bits in the RRC connection re-establishment request message.

According to another aspect of the present invention, a method for an LTE terminal sending an RRC connection re-establishment request is proposed.

According to the present invention, the method for an LTE terminal sending an RRC connection re-establishment request comprises:

the LTE terminal determines, according to the occurred scenario, that the failure reason is one of the following four types: radio resource failure, handoff failure, bottom layer error and UE-related error; and the LTE terminal initiates the RRC connection re-establishment request to a network side, wherein the RRC connection re-establishment request includes a failure cause value indicating the failure reason.

Preferably, the failure cause values corresponding to four types of failure reasons is mentioned above may be: the radio resource failure's cause value being rlFailure, the handoff failure's cause value being hoFailure, the bottom layer error's cause value being exceedMaxRLC-ReTrans, and the UE-related error's cause value being UE-RelatedFailure.

According to another aspect of the present invention, an LTE terminal is proposed.

The LTE terminal proposed according to the present invention includes:

a determining module, used to determine, according to the occurred scenario, which one of the following four types is the failure reason of an RRC connection re-establishment: radio resource failure, handoff failure, bottom layer error or UE-related error; and an RRC connection re-establishment request initiating module, used to initiate an RRC connection re-establishment request to a network side according to determining module's determination result, wherein the RRC connection re-establishment request includes a failure cause value indicating failure reason.

Preferably, the above-mentioned terminal may include a failure cause value setting module which is connected to the output port of the determining module. The setting module may be used to set the corresponding failure cause value according to determining module's determination result, and send it to the RRC connection re-establishment request initiating module.

According to the schemes proposed by the present invention, the flag bit indicating the failure reason added into the RRC connection re-establishment request message has been used to solve the problem that the network side cannot make corresponding processes with respect to the different connection re-establishment requests because it knows nothing about the particular reason why the UE initiates the connection re-establishment request, so that the network side could perform subsequent processes on the UE service according to the procedure of the UE service and the cause value included in the re-establishment request. At the same time, the network can analyze the present radio network's operational state according to the cause value of the re-establishment, thus the network optimization can be performed.

The other characters and advantages of the present invention will be described in the following specification, and partly be obvious from the specifications or understood by implementing the present invention. The objects and the other advantages of the present invention can be achieved or gained by the structure described particularly in the specifications, claims and drawings.

BRIEF DESCRIPTION OF THE DRAWINGS

The drawings described here are used to provide a further understanding of the present invention, which are parts of the present application. The schematic embodiments and the description of the present invention are used to explain the present invention, and constitute any improper limitation to the present invention. In the drawings.

DETAILED DESCRIPTION

Function Overview

Figure 1:
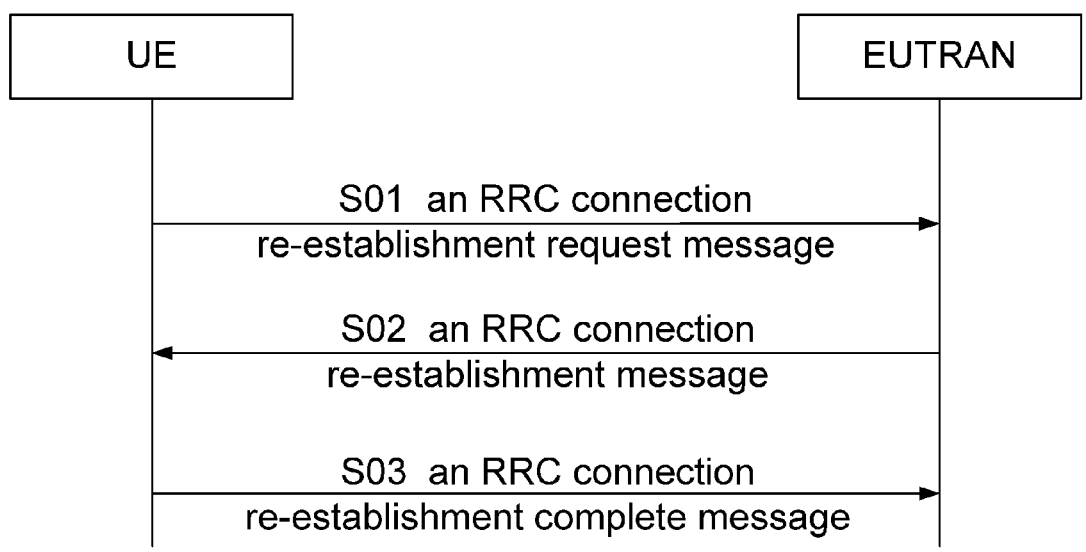
FIG. 1 is a flowchart illustrating the RRC connection re-establishment (successfully) according to related technologies.

According to the technical schemes of the present invention, the flag bit indicating the reason of failure is added into the RRC connection re-establishment request message, to make the network side is able to find out the related cause value why the UE initiates the RRC re-establishment request, so that the network side can perform corresponding processes depending on different reasons.

Method Embodiments

Firstly, four scenarios prescribed in 3GPP RRC protocol in which the UE needs to initiate an RRC connection re-establishment request are classified, and the classification takes into account the following principles:

(1) being capable of including all scenarios in which the UE sends the RRC connection re-establishment; and (2) setting the cause value according to the network's subsequent operations with respect to the different failure scenarios.

Therefore, the present invention provides the following classification methods.

The first type of reason is related to the radio resource: in scenario 1 and case D of scenario 4, the UE is waiting for the network to configure the radio resource.

The second type of reason is related to the handoff: in scenario 2 and case B of scenario 4, the UE is waiting for the network to decide the subsequent processes.

The third type of reason is the bottom layer error: in scenario 3, the UE is waiting to reset RLC.

The forth type of reason is related to the UE: in case A, C, E of scenario 4, related to a particular UE, and the UE is waiting for the network to reconfigure.

The present invention proposes the cause value of the re-establishment request according to four reasons of RRC connection re-establishment mentioned above, including:

the cause value of the first type of reason: the radio resource failure rlFailure;

the cause value of the second type of reason: the handoff failure hoFailure;

the cause value of the third type of reason: the bottom layer error exceedMaxRLC-ReTrans; and the cause value of the forth type of reason: the UE-related error UE-RelatedFailure.

According to different types of the RRC connection re-establishment reasons, the flag bit can be added into the RRC connection re-establishment request message to indicate the reason for RRC connection re-establishment. There are 2 bits which can be self-defined in the existing RRC connection re-establishment request message, and the present invention uses that 2 bits to indicate the cause values of the four types of RRC connection re-establishment reasons mentioned above.

More details of the present invention are described as follows.

When the UE detects the failure of a physical layer or a random access procedure, the radio link failure is determined, then the UE sets a timer. If the physical layer or the random access procedure is still not restored after the timer times out, then the UE initiates an RRC connection re-establishment request, and the cause value included in the re-establishment request is the radio resource failure rlFailure.

When the UE handoff happens, the timer T304 is set. If the timer times out, then the handoff failure is determined, and the UE is restored to the source cell configuration without the physical layer and initiates an RRC connection re-establishment request simultaneously, and the cause value included in the re-establishment request is handoff failure hoFailure.

When the UE detects that the RLC reaches the maximum retransmission times, the bottom layer error is determined, and reset is needed, thus the UE initiates an RRC connection re-establishment request, and the cause value included in the re-establishment request is bottom layer error exceedMaxRLC-ReTrans.

In the following cases, the UE determines the RRC connection reconfiguration fails:

A. measurement configuration fails;

B. mobility control (including security configuration), i.e. handoff, fails;

C. the configuration of non-access stratum dedicated information fails;

D. the configuration of dedicated radio resource fails; and

E. the configuration of the information related to the UE fails.

In case D, the UE sets the failure reason to be the radio resource failure rlFailure in the RRC connection re-establishment request message, and reports it to the network which reconfigures the radio resource or releases the RRC connection.

In case B, the UE sets the failure reason to be the handoff failure hoFailure in the RRC connection re-establishment request message, and reports it to the network. The network determines the subsequent processes, restores the source cell connection or delivers the handoff once more.

In case A, C or E, the UE sets the failure reason to be the UE-related error UE-RelatedFailure in the RRC connection re-establishment request message, and reports it to the network. The network reconfigures the parameters of the UE or releases the RRC connection.

Figure 2:
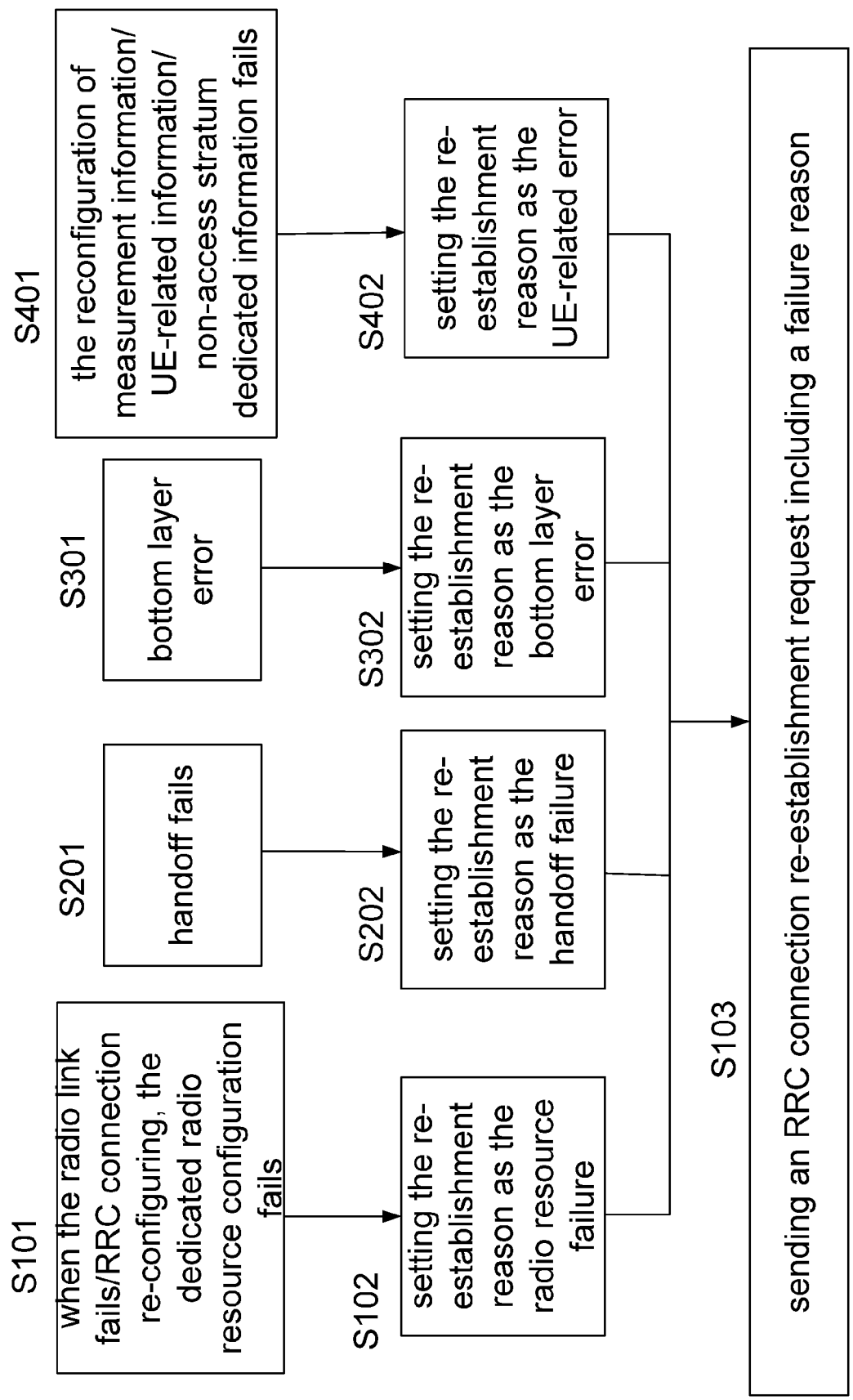
FIG. 2 is a flowchart illustrating the setting reason of the RRC connection re-establishment request according to an embodiment of the present invention.

In those cases mentioned above, a flowchart illustrating the RRC connection re-establishment according to an embodiment of the present invention is shown in FIG. 2.

Case 1

S101, a UE detects the failure of physical layer or random access procedure and sets a timer; if the physical layer or the random access procedure is still not restored after the timer times out, or the UE receives an RRC connection reconfiguration message, then the configuration of the dedicate radio resource fails;

S102, the reason of the RRC connection re-establishment is set to be radio resource failure (rlFailure); and S103, the UE sets the other fields of the RRC connection re-establishment request message and sends the message.

The eNB receives the failure reason indicating that the radio resource is abnormal and needs to be reconfigured. According to the current status and the service flow of the UE, the network side may deliver the radio resource configuration parameters or release the RRC connection etc.

Case 2

S201, a UE receives an RRC connection reconfiguration message, when the mobility control, i.e. handoff, is configured, service fails;

S202, the reason of RRC connection re-establishment is set to be handoff failure (hoFailure); and S103, the UE sets the other fields of the RRC connection re-establishment request message and sends the message.

The eNB receives the failure reason indicating the handoff failure. According to the current status and the service flow of the UE, the network side may restore the source cell connection or do the handoff once again etc.

Case 3

S301, a UE detects the bottom layer error, and the RLC identification reaches the maximum retransmission times;

S302, the reason of RRC connection re-establishment is set to be RLC reaching the maximum retransmission times, bottom layer error (exceedMaxRLC-ReTrans); and S103, the UE configures the other fields of RRC connection re-establishment request message and sends the message.

The eNB receives the failure reason indicating the bottom layer error and the RLC needs to be reset.

Case 4

S401, a UE receives an RRC connection reconfiguration message, the measurement information configuration fails, or the non-access stratum dedicated information configuration fails, or the UE-related information configuration fails S402, the reason of RRC connection re-establishment is set to be UE-related error (UE-RelatedFailure); and S103, the UE sets the other fields of RRC connection re-establishment request message and sends the message.

The eNB receives the failure reason indicating that the failure of the UE measurement information/non-access stratum dedicated information configuration/the UE-related information configuration in the RRC connection reconfiguration. According to the current status and the service flow of the UE, the network side may reconfigure the UE-related information or release the RRC connection etc.

According to the description above, the present invention can make the network side obtain the reason why the UE initiates the RRC re-establishment from the RRC connection re-establishment request message, so as to take different subsequent processes with respect to different failure reasons. At the same time, the network side can collect statistics of the re-establishment reasons and analyze the present network's operational state, and perform the radio network optimization.

According to the embodiments of the present invention, a type of computer readable media is proposed, which stores computer executable instructions. When the instructions are executed by a computer or a processor, the computer or the processor follows the steps in FIG. 2. Alternatively, one or more cases in the method embodiments mentioned above may be executed.

Equipment Embodiments

An LTE terminal is proposed in the present invention.

The equipment includes: a determining module, used to determine, according to the occurred scenario, which one of the following four types is the failure reason of RRC connection re-establishment: radio resource failure, handoff failure, bottom layer error or UE-related error; a failure cause value setting module which is connected to an output port of the determining module, used to set the corresponding failure cause value according to the determining module's determination result and then send it to an RRC connection re-establishment request initiating module; and the RRC connection re-establishment request initiating module, used to initiate an RRC connection re-establishment request according to the determining module's determination result, in which the RRC connection re-establishment request includes the failure cause value indicating the failure reason to the network side.

According to the description above, the present invention can make the network side obtain the reason why the UE initiates the RRC re-establishment from the RRC connection re-establishment request message, so as to take different subsequent processes with respect to different failure reasons. At the same time, the network side can collect statistics of the re-establishment reasons and analyze the present network's operational state, and perform the radio network optimization.

In addition, the embodiments of the present invention conform to system framework and existing procedures, so that it is easy to realize and it popularizes in technical field and has industrial applicability.

What is claimed is:

1. A method for setting a cause value for an RRC connection re-establishment request of an Long Term Evolution (LTE) terminal, wherein scenarios in which the LTE terminal needs to initiate an Radio Resource Control (RRC) connection re-establishment request including that: (1) a User Equipment (UE) detects radio link failure; (2) a cell handoff fails in Evolved-Universal Terrestrial Radio Access Network (E-UTRAN); (3) an Radio Link Control (RLC) identification reaches the maximum retransmission times, and needs to be reset; (4) RRC connection reconfiguration fails; wherein the RRC connection reconfiguration failure further including: (a) measurement configuration failure; (b) mobility control, including security configuration, i.e. handoff, failure; (c) non-access stratum dedicated information configuration failure; (d) dedicated radio resource configuration failure; and (e) UE-related information configuration failure;

when scenario (1) and case (d) of scenario (4) occur, the LTE terminal adding a flag bit into an RRC connection re-establishment request message, indicating a failure reason is the radio resource failure;

when scenario (2) and case (b) of scenario (4) occur, the LTE terminal adding a flag bit into an RRC connection re-establishment request message, indicating a failure reason is the handoff failure;

when scenario (3) occurs, the LTE terminal adding a flag bit into an RRC connection re-establishment request message, indicating a failure reason is the bottom layer error;

when case (a), (c), (e) of scenario (4) occur, the LTE terminal adding a flag bit into an RRC connection re-establishment request message, indicating a failure reason is the UE error.

2. The method according to claim 1, wherein the flag bit indicating failure reasons occupies 2 bits in the RRC connection re-establishment request message.

3. A method for an LTE terminal in a RRC connected state to send an RRC connection re-establishment request, comprising:

the LTE terminal determining, according to an occurred scenario, which one of the following four types is a failure reason: radio resource failure, handoff failure, bottom layer error and UE-related error; wherein determining the failure reason is radio resource failure when the terminal detects radio link failure or dedicated radio resource configuration failure;

determining the failure reason is handoff failure when the terminal detects that a cell handoff fails in E-UTRAN or mobile control fails;

determining the failure reason is bottom layer error when the terminal detects that the RLC identification reaches the maximum retransmission times;

determining the failure reason is the UE-related error when the terminal detects that measurement configuration fails, the configuration of non-access stratum dedicated information fails or the UE-related information configuration fails; and the LTE terminal initiating the RRC connection re-establishment request to a network side, wherein the RRC connection re-establishment request includes a failure cause value indicating the failure reason.

4. The method according to claim 3, wherein the failure cause values corresponding to the four types of failure reasons are respectively: the radio resource failure's cause value being radio link failure (rlFailure), the handoff failure's cause value being Handoff failure (hoFailure), the bottom layer error's cause value being Maximum Radio Link Control-Retransmission (exceedMaxRLC-ReTrans), and the UE-related error's cause value being UE-RelatedFailure.

5. The method according to claim 3, wherein after the terminal detects the failure of a physical layer or a random access procedure, a radio link failure is determined, and the terminal sets a timer; if the physical layer or the random access procedure is still not restored after the timer times out, then the UE initiates an RRC connection re-establishment request and the failure cause value included in the re-establishment request is the radio resource failure rlFailure;

when the terminal handoff happens, timer T304 is set; if the timer times out, the handoff failure is determined, then the terminal is restored to the source cell configuration except the physical layer and initiates an RRC connection re-establishment request simultaneously, and the cause value included in the re-establishment request is the handoff failure hoFailure; or when the terminal detects that the RLC reaches the maximum retransmission times, the bottom layer error is determined and reset is needed; the terminal initiates an RRC connection re-establishment request, and the cause value included in the re-establishment request is the bottom layer error exceedMaxRLC-ReTrans.

6. The method according to claim 3, wherein
when dedicated radio resource configuration fails, the terminal determines the failure reason to be the RRC connection reconfiguration failure, and the failure cause value is set to be the radio resource failure rlFailure in the RRC connection re-establishment request message, and is reported to the network which reconfigures the radio resources or releases the RRC connection;
when mobility control fails, the terminal determines the failure reason to be RRC connection reconfiguration failure; the failure cause value is set to be handoff failure hoFailure in the RRC connection re-establishment request message, and is reported to network which determines the subsequent processes, restores the source cell connection or delivers the handoff once more; or
when measurement configuration fails, the configuration of non-access stratum dedicated information fails or the UE-related information configuration fails, the terminal determines the failure reason to be RRC connection reconfiguration failure, and the failure cause value is set to be the UE-related error UE-RelatedFailure in the RRC connection re-establishment request message, and is reported to the network which reconfigures parameters of the terminal or releases the RRC connection.

7. An LTE terminal, comprising:
a determining module, used to determine, according to an occurred scenario, which one of the following four types is the failure reason of an RRC connection re-establishment: radio resource failure, handoff failure, bottom layer error or UE-related error; wherein
determining the failure reason is radio resource failure when the terminal detects radio link failure or dedicated radio resource configuration failure;
determining the failure reason is handoff failure when the terminal detects that a cell handoff fails in E-UTRAN or mobile control fails;
determining the failure reason is bottom layer error when the terminal detects that the RLC identification reaches the maximum retransmission times;
determining the failure reason is the UE-related error when the terminal detects that measurement configuration fails, the configuration of non-access stratum dedicated information fails or the UE-related information configuration fails; and
an RRC connection re-establishment request initiating module, used to initiate an RRC connection re-establishment request to a network side according to the determining module's determination result, wherein the RRC connection re-establishment request includes a failure cause value indicating the failure reason; and
wherein before the determining module determines the failure reason of the RRC connection re-establishment, the LTE terminal is in an RRC connected state.

8. The LTE terminal according to claim 7, further comprising: a failure cause value setting module which is connected to an output port of the determining module, used to set the corresponding failure cause value according to the determining module's determination result, and send it to the RRC connection re-establishment request initiating module.

* * * * *